United States Patent
Omohundro et al.

(10) Patent No.: US 12,356,881 B2
(45) Date of Patent: Jul. 15, 2025

(54) VEHICLE ELECTRIC MOTOR HYDRAULIC PUMP DECOUPLING

(71) Applicant: Zimeno Inc., Livermore, CA (US)

(72) Inventors: Zachary Meyer Omohundro, Livermore, CA (US); Matthew Michael O'Brien, Livermore, CA (US); Matthew Coleman Tindall, Long Beach, CA (US); Karan Kaushik, Fremont, CA (US)

(73) Assignee: Zimeno Inc., Livermore, CA (US)

( * ) Notice: Subject to any disclaimer, the term of this patent is extended or adjusted under 35 U.S.C. 154(b) by 0 days.

(21) Appl. No.: 18/675,088

(22) Filed: May 27, 2024

(65) Prior Publication Data
US 2024/0306529 A1   Sep. 19, 2024

Related U.S. Application Data

(63) Continuation of application No. 18/163,996, filed on Feb. 3, 2023, now Pat. No. 11,991,943.

(60) Provisional application No. 63/306,480, filed on Feb. 3, 2022.

(51) Int. Cl.
A01B 71/06 (2006.01)

(52) U.S. Cl.
CPC .................... *A01B 71/06* (2013.01)

(58) Field of Classification Search
CPC ..... A01B 71/06; B62D 33/0625; B60K 17/34
See application file for complete search history.

(56) References Cited

U.S. PATENT DOCUMENTS

| | | | |
|---|---|---|---|
| 6,109,384 | A | 8/2000 | Bromley et al. |
| 8,960,341 | B2 | 2/2015 | Weber |
| 11,548,496 | B2 | 1/2023 | Otsuki et al. |
| 2005/0006164 | A1 | 1/2005 | Teraoka |
| 2012/0083955 | A1 | 4/2012 | Noguchi |
| 2012/0259492 | A1 | 10/2012 | Yamamoto et al. |
| 2013/0190986 | A1 | 7/2013 | Nishimori |
| 2013/0341934 | A1 | 12/2013 | Kawanishi |

(Continued)

FOREIGN PATENT DOCUMENTS

JP   2007198547 A   8/2007

OTHER PUBLICATIONS

PCT Search Report for PCT/US2023/012256 mailed May 2, 2023.

(Continued)

*Primary Examiner* — Drew J Brown
(74) *Attorney, Agent, or Firm* — Rathe Lindenbaum LLP

(57) ABSTRACT

A vehicle may operate in a first mode in which rear traction members of the vehicle are driven forwardly by an electric motor and a hydraulic pump is powered and may alternatively operate in a second mode in which the rear traction members are driven forwardly by the electric motor while the electric motor is operably decoupled from the hydraulic pump. A controller determines a state of an implement attached to the vehicle, a present or forthcoming turning state of the vehicle, a geo-referenced location of the vehicle, a slip of the vehicle, and/or a camera captured image of terrain. The controller outputs a recommendation for either the first mode or the second mode based upon the determination or automatically switches between the first mode and the second mode based on the determination.

21 Claims, 4 Drawing Sheets

(56) References Cited

U.S. PATENT DOCUMENTS

| | | | |
|---|---|---|---|
| 2014/0231165 A1 | 8/2014 | Hori | |
| 2015/0014081 A1 | 1/2015 | Noguchi | |
| 2015/0046005 A1 | 2/2015 | Kasuya et al. | |
| 2016/0280064 A1* | 9/2016 | Nozu | F16D 48/06 |
| 2016/0311438 A1 | 10/2016 | Wang et al. | |
| 2018/0345949 A1 | 12/2018 | Holmes et al. | |
| 2020/0094840 A1* | 3/2020 | Nolin | B60W 30/18172 |
| 2021/0188252 A1 | 6/2021 | Lu et al. | |

OTHER PUBLICATIONS

Rosa, U.A. & Upadhyaya, S.D. & Chen, P., (2000), Modeling and verification of an auto front-wheel-drive system, Transactions of the ASAE, 43, 23-29, 10.13031/2013.2683.

Wiley, Jack C. & Turner, Reed J., "Power Hop Instability of Tractors", ASAB Distinguished Lecture Series No. 32, Feb. 2008, American Society of Agricultural and Biological Engineers.

\* cited by examiner

VEHICLE ELECTRIC MOTOR HYDRAULIC PUMP DECOUPLING

CROSS-REFERENCE TO RELATED PATENT APPLICATIONS

The present application claims priority under 35 USC § 120 from co-pending U.S. patent application Ser. No. 18/163,996 filed on Feb. 23, 2023, by Omohundro et al, which claims priority under 35 USC § 119 from U.S. Provisional Patent Application Ser. No. 63/306,480 filed on Feb. 3, 2022, by Omohundro et al. and entitled VEHICLE ELECTRIC MOTOR HYDRAULIC PUMP DECOUPLING, the full disclosures of which are hereby incorporated by reference.

BACKGROUND

Electric vehicles, such as electric tractors, utilize electric motors to propel the vehicle. Some electric vehicles may use an electric motor to power a hydraulic pump, wherein the hydraulic pump drives a hydraulic motor to assist in propelling the vehicle. The hydraulic pump may be additionally utilized to power hydraulic components of the vehicle or hydraulically powered vehicle attachments. In such electric vehicles, it may be important to conserve battery power to extend use of the vehicle between battery charging.

Figures 1, 2:
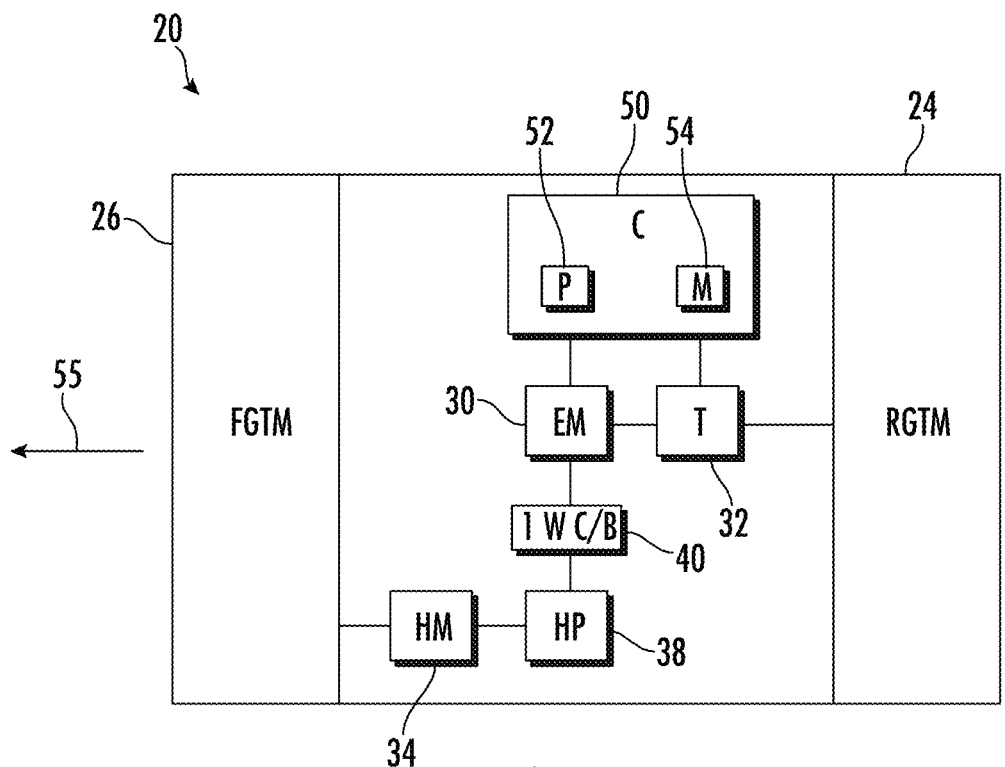
FIG. 1 is a diagram schematically illustrating portions of an example vehicle comprising an example vehicle propulsion system.
FIG. 2 is a flow diagram of an example vehicle propulsion method.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Disclosed are example vehicles, vehicle propulsion methods and computer readable instructions that may assist in conserving battery power in those vehicles that utilize a hydraulic pump and hydraulic motor to assist in propelling the vehicle. The example vehicles, methods and computer readable instructions facilitate disconnection or decoupling of the hydraulic pump from the electric motor to conserve battery energy. The example vehicles, methods and computer readable instructions facilitate decoupling of the hydraulic pump from the electric motor in those circumstances when propulsion of the vehicle by the hydraulic motor and the hydraulic pump may be temporally discontinued. In contrast to disconnecting the hydraulic motor from ground traction members or disconnecting the hydraulic motor from the hydraulic pump, disconnecting the hydraulic pump from the electric motor may enhance efficiency in that energy is not wastefully consumed driving the hydraulic pump when hydraulic power is not being utilized.

The example vehicles, vehicle propulsion methods and computer readable instructions may provide a less complex and lower cost arrangement for disconnecting the hydraulic pump from the electric motor. The example vehicles, vehicle propulsion methods, and computer readable instructions facilitate operation of the vehicle in one of two selected modes. In a first mode, the vehicle is driven in a forward direction by driving the output shaft of the electric motor in a first direction to transmit torque to rear ground traction members of the vehicle and to also transmit torque to a hydraulic pump. In a second mode, the vehicle is driven in the forward direction by driving the output shaft of the electric motor in a second direction to transmit torque to the rear ground traction members, wherein torque is not transmitted to the hydraulic pump, decoupling the hydraulic pump from the electric motor.

In the example implementations, a one-way clutch or one-way bearing is operably coupled between the electric motor and the hydraulic pump. In the first mode, torque from the electric motor is transmitted by the one-way clutch to the hydraulic pump. Torque from the electric motor is further transmitted by a first reversible transmission to the rear ground traction members to propel the vehicle in a forward direction. In the second mode, the electric motor is reversed such that torque from the electric motor is not transmitted by the one-way clutch to the hydraulic pump. In the second mode, the reversible transmission is also placed in a reversed state such that the torque from the electric motor is transmitted to the rear ground traction members to propel the vehicle in the forward direction.

In some implementations, the hydraulic pump and the hydraulic motor, in the first mode, independently propel the front ground traction members. In some implementations, the hydraulic pump and the hydraulic motor, in the first mode, assist in propelling the front ground traction members. For example, in some implementations, the electric motor may be directly coupled to the front ground traction members to supply torque directly to the front ground traction members. At the same time, the hydraulic motor may concurrently provide additional torque to the front ground traction members. In some implementations, torque from the electric motor and torque from the hydraulic motor may be combined and transmitted to the front ground traction members by a planetary gear assembly.

In some implementations, torque from the electric motor may be utilized to drive both the rear ground traction members and the front ground traction members, wherein the additional torque provided by the hydraulic motor to the front ground traction members facilitates driving of the (small) front ground traction members at a greater rotational speed relative to the rotational speed at which the (large) rear ground traction members are being driven for providing the rear and front ground traction members to covering the same ground distances, thus creating a zero "lead" condition. A zero lead condition occurs when the rear and front ground traction members both have the same ground speed (the ground distance that would be traversed per unit time, based upon the rotational velocity of the traction members and their diameters). Since the front tires are smaller in diameter than the rear tires, the front tires need to rotate faster than the rear tires to create the zero lead condition. The ground speed of the front and rear traction members are always less than the actual ground speed of the vehicle in order for traction to be developed on each ground traction member to propel the vehicle.

Driving the front traction members at a "much greater" ground speed than the rear traction members creates a positive lead. Driving the front traction members at a lesser ground speed than the rear traction members creates a negative lead. By driving the front ground traction members at a greater rotational speed than the rear ground traction members, such that the front ground traction members cover larger ground distances than the rear ground traction members, by providing the front ground traction members with a positive "lead", under-steering of the vehicle may be reduced during turning of the vehicle when encountering low traction conditions. In those circumstances where there is sufficient traction for the vehicle, such as when the vehicle runs on hard surfaces, it may not be as beneficial to provide the front ground traction members with front wheel drive. The pump is decoupled from the motor and the hydraulic motor runs freely. The example vehicles, methods and computer readable instructions facilitate decoupling of the hydraulic motor in the hydraulic pump in such circumstances to conserve battery energy.

In some implementations, the amount of rotational speed supplied by the hydraulic motor to the front ground traction members may be varied relative to the amount of rotational speed supplied by the electric motor to the rear ground traction members. In some implementations, the hydraulic pump may comprise a variable displacement hydraulic piston or vane pump to vary powering of the hydraulic motor so as to vary the rotational speed supplied by the hydraulic motor to the front ground traction members.

In some implementations, the vehicle comprises a transaxle and a planetary gear assembly. The transaxle is operably coupled to the electric motor to receive torque from the electric motor. The planetary gear assembly may comprise an output operably coupled to the front ground traction members, a first input operably coupled to the transaxle to receive torque from the transaxle and a second input operably coupled to the hydraulic motor to receive torque from the hydraulic motor. In some implementations, the first input may comprise a ring gear, the second input may comprise a sun gear and the output may comprise a planet carrier supporting planet gears between the sun gear and the ring gear.

In some implementations, the vehicle may operate in a third mode in which electric motor shaft is driven in the first direction and in which the transmission is in the reversed state to propel the vehicle in a rearward direction. In some implementations, the vehicle may operate in a fourth mode in which the electric motor shaft is driven in the second direction and in which the transmission is in the forward state so as to decouple the electric motor from the hydraulic pump while propelling the vehicle in a rearward direction.

In some implementations, the vehicle is switched between the first mode and the second mode in response to operator input. A local operator residing on or in the vehicle or a remote operator remotely operating the vehicle may provide a command or input switching the vehicle between the first mode and the second mode. For example, the operator may appreciate the circumstance that the vehicle is about to travel along a road or highway having an underlying pavement providing a high degree of traction or that turning of the vehicle will be less frequent. In such circumstances, in appreciation that providing the front traction members of the vehicle with a lead may not be as beneficial, the operator may provide an input to a controller which actuates the vehicle from the first mode to the second mode in which the hydraulic pump is decoupled from the electric motor. In the second mode, the front traction members may be idling, freely rotating without any applied torque as the vehicle is driven forward solely by the rear traction members. When the vehicle is about to enter a field and encounter lower traction conditions, the operator may input a command to the controller to actuate the vehicle to the first mode to once again provide the front ground traction members of the vehicle with a small positive or small negative lead to assist the vehicle in creating additional traction and reducing excessive tire slip of the rear traction members and increasing vehicle tractive efficiency.

In some implementations, the vehicle may provide the operator with recommendations or suggestions as to the timing for switching between the first mode and the second mode. Such suggestions may be provided by a visible recommendation provided on a display or monitor or providing an audible notice or indication to the operator. In some implementations, the recommendation may be based upon a determined current or predicted slip of the vehicle. The slip of the vehicle traction members may be determined by comparing rotational velocity of the rear and/or front ground traction members during a period of time relative to an actual distance traversed by the vehicle during the period of time.

In some implementations, the recommendation may be based upon a geo-referenced location of the vehicle. The geo-referenced location of the vehicle may be determined by using global positioning system (GPS) signals. The GPS determined location of the vehicle may be compared to a predefined map which indicates probable traction conditions for different regions on the map. For example, GPS signals may indicate that the vehicle is traveling along a pavement or highway where high traction conditions may exist. In such circumstances, a controller may provide the operator with a recommendation to switch the vehicle to the second mode. Alternatively, GPS signals indicate that the vehicle is about to enter a field or other terrain having low traction conditions where the vehicle may be vulnerable to slip. In such circumstances, the controller may provide the operator with the recommendation to switch the vehicle to the first mode.

In some implementations, a camera or other sensor on the vehicle may detect the forthcoming terrain conditions, wherein the recommendation may be based upon such forthcoming terrain conditions. In some implementations, rather than providing a suggestion or recommendation to the operator to switch between modes, a controller may be used to automatically switch between the modes based upon the determined slip or traction conditions and/or a geo-referenced location of the vehicle.

Disclosed is an example vehicle that may comprise rear ground traction members, front ground traction members, an electric motor, a reversible transmission operably coupling the electric motor to the rear ground traction members to drive the rear ground traction members, a hydraulic motor operably coupled to the front ground traction members, a hydraulic pump operably coupled to the electric motor for being powered by the electric motor and operably coupled to the hydraulic motor to drive the hydraulic motor, a one-way clutch/bearing operably coupled between the electric motor and the hydraulic pump, and a controller. The controller may operate in a first selected mode by transmitting control signals to the reversible transmission to cause the transmission to operate in a forward state and to the electric motor to cause electric motor to operate in a forward state in which the front ground traction members are driven forwardly. The controller may operate a second selected mode by transmitting control signals to the transmission to cause the transmission to operate in a reversed state and to the electric motor to cause the electric motor to operate in a reversed state in which the rear ground traction members are driven forwardly and in which the electric motor is operably decoupled from the hydraulic pump by the one-way clutch/bearing.

Disclosed is an example vehicle propulsion method. The example vehicle propulsion method may comprise operating a vehicle in a first mode in which an electric motor output shaft is driven in a first direction to transmit torque to rear ground traction members of the vehicle and to transmit torque to a hydraulic pump such that the vehicle is driven in a forward direction. The method may further comprise operating the vehicle in a second mode in which the electric motor shaft is driven in a second direction to transmit torque to the rear ground traction members, wherein torque is not transmitted to the hydraulic pump and wherein the vehicle is driven in the forward direction.

Disclosed is an example non-transitory computer-readable medium containing instructions for directing a processor. The instructions may comprise slip evaluation instructions for directing the processor to evaluate a slip condition for ground traction members of the vehicle and mode control instructions. The mode control instructions may direct the processor: (1) to operate the vehicle in a first mode in response to a first slip condition by transmitting control signals to the reversible transmission to cause the transmission to operate in a forward state and to the electric motor to cause electric motor to operate in a forward state in which the front ground traction members are driven forwardly; and (2) to operate the vehicle in a second mode in response to a second slip condition by transmitting control signals to the transmission to cause the transmission to operate in a reversed state and to the electric motor to cause the electric motor to operate in a reversed state in which the rear ground traction members are driven forwardly and in which the electric motor is operably decoupled from the hydraulic pump by the one-way clutch/bearing.

For purposes of this disclosure, the term "coupled" shall mean the joining of two members directly or indirectly to one another. Such joining may be stationary in nature or movable in nature. Such joining may be achieved with the two members, or the two members and any additional intermediate members being integrally formed as a single unitary body with one another or with the two members or the two members and any additional intermediate member being attached to one another. Such joining may be permanent in nature or alternatively may be removable or releasable in nature. The term "operably coupled" shall mean that two members are directly or indirectly joined such that motion may be transmitted from one member to the other member directly or via intermediate members. The term "fluidly coupled" shall mean that two or more fluid transmitting volumes are connected directly to one another or are connected to one another by intermediate volumes or spaces such that fluid may flow from one volume into the other volume.

For purposes of this disclosure, the phrase "configured to" denotes an actual state of configuration that fundamentally ties the stated function/use to the physical characteristics of the feature proceeding the phrase "configured to".

For purposes of this disclosure, unless explicitly recited to the contrary, the determination of something "based on" or "based upon" certain information or factors means that the determination is made as a result of or using at least such information or factors; it does not necessarily mean that the determination is made solely using such information or factors. For purposes of this disclosure, unless explicitly recited to the contrary, an action or response "based on" or "based upon" certain information or factors means that the action is in response to or as a result of such information or factors; it does not necessarily mean that the action results solely in response to such information or factors.

FIG. 1 is a diagram schematically illustrating portions of an example vehicle 20. Vehicle 20 may be in the form of a tractor or in the form of a different type of self-propelled vehicle. Vehicle 20 comprises rear ground traction members 24, front ground traction members 26, electric motor 30, reversible transmission 32, hydraulic motor 34, hydraulic pump 38, one-way clutch/bearing 40 and controller.

Rear ground traction members 24 extend along a rear of vehicle 20. Front ground traction members 26 extend along the front of vehicle 20. Front ground traction members 26 are configured to be turned or steered to control the direction of travel or trajectory of vehicle 20. In some implementations, rear ground traction members 24 and front ground traction members 26 comprise wheels. In some implementations, rear ground traction members 24 and/or front ground traction members 26 comprise tracks.

Electric motor 30 comprises a motor powered by an electric battery to be carried by vehicle 20. Electric motor 30 provides torque for driving rear ground traction members 24. Reversible transmission 32 is operably coupled between electric motor 30 and rear ground traction members 24. Reversible transmission 32 is actuatable or switchable between a forward state and a reversed state. In some implementations, reversible transmission 32 comprises a gearbox or set of gears and clutches to facilitate the transmission of selectable different amounts of torque at different rotational speeds, in either selectable direction, to rear ground traction members 24.

Hydraulic motor 34 comprises a mechanical actuator that converts hydraulic pressure and flow into torque and angular displacement (rotational speed). Hydraulic motor 34 has an output shaft operably coupled to front ground traction members 26 so as to assist in propelling or driving front ground traction members 26. In some implementations, hydraulic motor 34 is configured to drive or propel front ground traction members 26 independent of other sources of torque. In some implementations, transmission 32, or another transmission, transmits torque from electric motor 30 to front ground traction members 26, wherein both the hydraulic motor 34 and the electric motor 30 concurrently provide torque to front ground traction members 26. In some implementations, the additional torque and rotational speed provided by hydraulic motor 34 to front ground traction members 26 provides front ground traction members 26 with a higher ground speed as compared to the ground speed of rear ground traction members 24 so as to provide front ground traction members 26 with a positive lead for addressing or countering under-steering by increasing the front members lead during turning. In some implementations, electric motor 30 and hydraulic motor 34 are both coupled to front ground traction members 26 by a planetary gear assembly.

Hydraulic pump 38 comprise a device that is electrically powered by electric motor 30 and that generates a pressurized flow of hydraulic fluid. The pressurized flow of hydraulic fluid may be supplied to hydraulic motor 34, via hoses or other fluid conduits) so as to drive hydraulic motor 34. In some implementations, hydraulic pump 38 may comprise a variable displacement hydraulic piston or vane pump which may be controlled so as to vary the hydraulic power supplied to hydraulic motor 34 and vary the rotational speed of front ground traction members 26.

One-way clutch/bearing 40 is operably coupled between electric motor 30 and hydraulic pump 38. One-way clutch/bearing 40 comprise a device that transmits torque in a first direction and that does not transmit torque in a second opposite direction. In some implementations, one-way clutch/bearing 40 may comprise a ratcheting type bearing. One-way clutch/bearing 40 may automatically couple or decouple electric motor 30 from hydraulic pump 38 depending upon the direction of torque supplied to bearing 40 by electric motor 30.

Controller 50 controls at least some operations of vehicle 20. Controller 50 may be in the form of hardware (electronic circuitry) and/or software. Controller 50 comprises processing unit 52 and a non-transitory computer-readable medium 54. Processing unit 52 carries out instructions contained in medium 54. The instructions in medium 54 may direct processing unit 52 to carry out method 100 of FIG. 2.

As indicated by block 104 of method 100 of FIG. 2, instructions in medium 54 may cause processing unit 52 to output control signals resulting in vehicle 20 operating in a first mode. In the first mode, an output shaft of electric motor 30 is driven in a first direction so as to transmit torque to rear ground traction members 24 of vehicle 20. In the first mode, the torque supplied by electric motor 30 is in a direction such that one-way clutch/bearing 40 transmits the torque to hydraulic pump 38. The hydraulic pump 38 may generate and supply a flow of pressurized fluid for powering hydraulically powered components of vehicle 20 and/or hydraulically powered attachments (extensions or implements) carried by vehicle 20. In the example illustrated, the hydraulic pump 38 supplies a flow of pressurized fluid to drive hydraulic motor 34 which drives front ground traction members 26 to assist in propelling vehicle 20 in a forward direction as indicated by arrow 55.

As indicated by block 108 of FIG. 2, instructions of medium 54 may cause processing unit 52 to output control signals resulting in vehicle 20 operating in a second alternative mode. In the second mode, the output shaft of electric motor 30 is driven in a second direction, opposite to the first direction, so as to transmit torque to the rear ground traction members. The one-way clutch/bearing 40 does not transmit the torque output by electric motor 30 in the second direction. As a result, the hydraulic pump 38 is operationally decoupled from electric motor 30 by the one-way clutch/bearing 40. In the second mode, instructions of medium 54 further direct processing unit 52 to output control signals actuating transmission 32 to a reversed state. Because both the electric motor 30 and the transmission 32 are in a reversed state, in the second mode, vehicle 20 is propelled in the forward direction as indicated by arrow 55.

Vehicle 20 facilitates the driving of vehicle 20 in a forward direction with or without electric motor 30 powering the hydraulic pump 38. Coupling or decoupling of the hydraulic pump 38 from the electric motor may be automatically carried out in response to the direction of torque output by electric motor 30 and the reversed or forward state of transmission 32. The coupling and decoupling of the hydraulic pump 38 from electric motor 30 may be achieved without more complex, heavy and space consuming actuatable clutches between the electric motor 30 and the hydraulic pump 38. As a result, the cost, complexity and size of vehicle 20 may be reduced.

Figure 3:
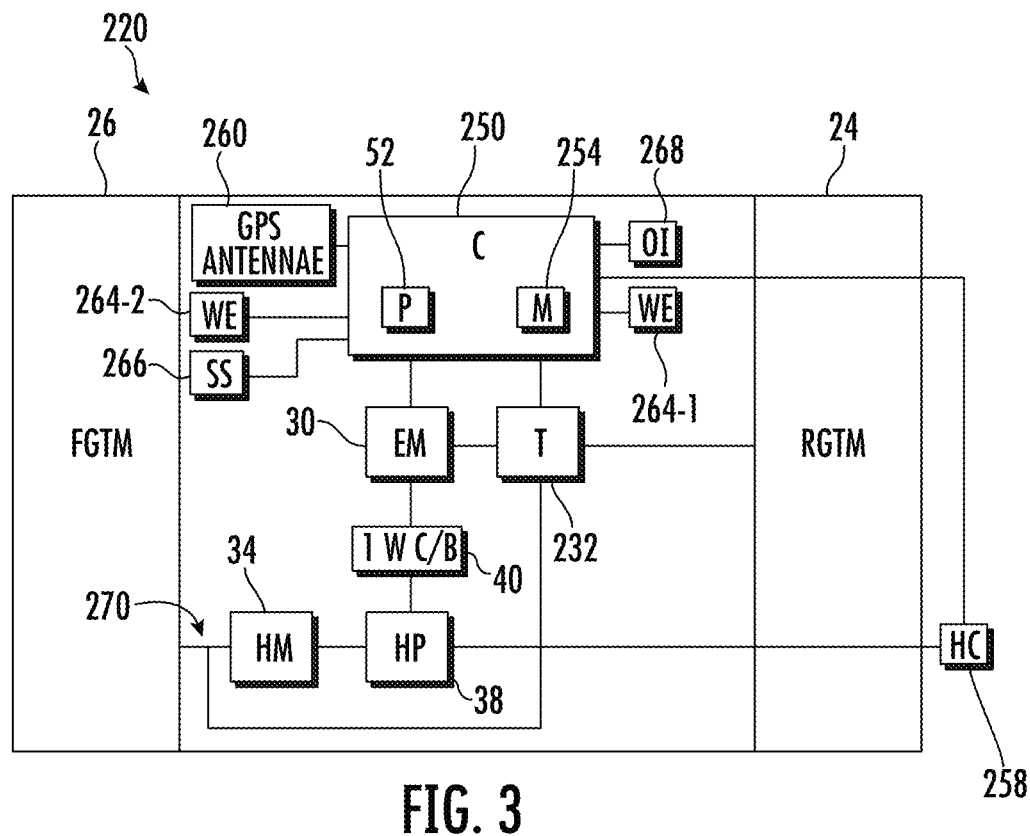
FIG. 3 is a diagram schematically illustrating portions of an example vehicle comprising an example vehicle propulsion system.

FIG. 3 is a diagram schematically illustrating portions of an example vehicle 220. FIG. 3 illustrates examples of how a hydraulic motor powered by hydraulic pump powered by an electric motor may be used to vary the lead of front ground traction members to reduce slip of a vehicle and how the hydraulic pump may be selectively decoupled from the electric motor when the vehicle may not be vulnerable to slip conditions. Vehicle 220 is similar to vehicle 20 described above except that vehicle 220 comprises transmission 232 in place of transmission 32, comprises controller 250 in place of controller 50, and additionally comprises hydraulic coupling 258, GPS antenna 260, speed sensors 264-1, 264-2 (collectively referred to as sensors 264), steering sensor 266 and operator interface 268. The remaining components of vehicle 220 which correspond to components of vehicle 20 are numbered similarly.

Transmission 232 is similar to transmission 32 in that transmission 232 is reversible, operable to transmit torque and rotational speed in either direction. As schematically shown, transmission 232 further outputs torque to front ground traction members 26. In the example illustrated, torque from electric motor 30 is transmitted by transmission 232 to a junction 270 where the torque from electric motor 30 (via transmission 232) and the torque from hydraulic motor 34 are combined before being transmitted to front ground traction members 26. In one implementation, junction 270 may comprise a planetary gear assembly. In some implementations, transmission 232 comprise a transaxle which transmits the torque from electric motor 30 to junction 270.

Hydraulic coupling 258 comprise a connector for connection to a hydraulic fluid line, such as a hose, of a hydraulically powered attachment. A hydraulically powered attachment may comprise a hydraulically powered extension which is mounted to and carried by vehicle 220. In such an implementation, the hydraulically powered extension may include a hydraulic motor driving a mechanical component and/or a hydraulic cylinder-piston assembly for raising and lowering, extending and retracting or otherwise carrying out an operation of the extension. For example, vehicle 220 may comprise a tractor having a sprayer boom, wherein hydraulic power is utilized to extend and retract the sprayer boom. In some implementations, vehicle 220 may include a bucket, wherein the bucket may be tilted, raised or lowered using a hydraulic cylinder-piston assembly. In some implementations, the hydraulically powered attachment may comprise a hydraulically powered implement being pushed, pulled, towed or carried by vehicle 20, wherein the hydraulically powered implement may include a hydraulic motor, a hydraulic piston-cylinder assembly or the like for carrying out one or more operations of the implement and/or for adjusting a height or position of the implement.

GPS antenna 260 comprises a signal receptor configured to receive data/signals from multiple GPS satellites. GPS antenna 260 is associated with a GPS receiver (provided as part of controller 250) for calculating position (and time) based upon the data/signals received by antenna. The position of vehicle 220, as determined from GPS signals, may be utilized to determine a geo-referenced location of vehicle 220 (latitude and longitude accordance of vehicle 220) at a particular moment in time and may be utilized to determine the velocity of vehicle 220 over a particular period of time. In other implementations, other geo-referencing systems and hardware may be utilized to detect or determine a geo-referenced location of vehicle 220. It should be appreciated that with each of the above and below described example implementations, other geo-referencing systems and hardware for determining a geo-referenced location of a vehicle may be utilized.

Speed sensors 264-1 and 264-2 output signals indicating the rotational speed of rear and front ground traction members 24 and 26, respectively. In the example illustrated, speed sensors 264 comprise wheel encoders. In other implementations, speed sensors 264 may comprise other forms of sensors for outputting signals that indicate the rotational speed of traction members 24 and 26.

Steering sensor 266 comprise a sensor configured to output signals indicating a measurement of the current turning radius of front ground traction members 26. In some implementations, steering sensor 266 comprise a potentiometer. In other implementations, steering sensor 266 may comprise other forms of sensors that may output signals indicating turning or steering of front ground traction members 26.

Operator interface 268 comprise a device facilitating the presentation of information to an operator and the receipt of selections or commands from the operator. In some implementations, operator interface 268 may comprise a touch screen display or monitor. In some implementations, operator interface 268 may comprise a display screen and an operator input device such as a keyboard, touchpad, mouse, joystick, toggle bar, switch or the like. In some implementations, the operator input device may comprise a microphone with associated speech recognition programming or software. In the example illustrated, operator interface 268 is carried by vehicle 220, such as in the operator cabin of the vehicle. In some implementations, operator interface 268 may be separate and remote from vehicle 220, wherein operator interface 268 is in wireless communication with vehicle 220 to facilitate remote control of vehicle 220.

Controller 250 controls at least some operations of vehicle 220. Controller 250 may be in the form of hardware (electronic circuitry) and/or software. Controller 50 comprises processing unit 52 and a non-transitory computer-readable medium 254. Processing unit 52 carries out instructions contained in medium 254. The instructions in medium 254 may direct processing unit 52 to carry out method 100 of FIG. 2. The instructions in medium 254 may further control when and how vehicle 220 is switched between the first mode and the second mode.

Figure 4:
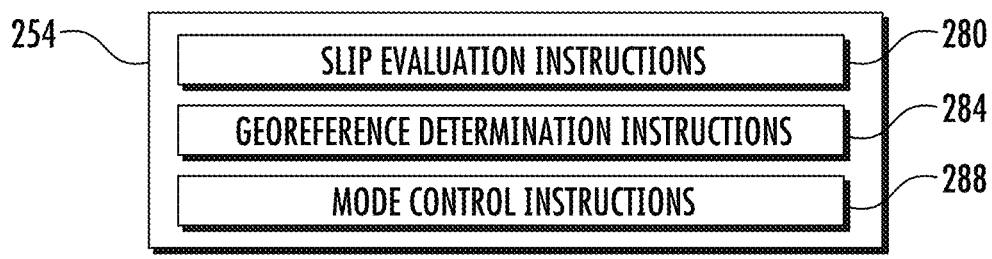
FIG. 4 is a diagram illustrating portions of an example non-transitory computer-readable medium containing vehicle propulsion instructions.

FIG. 4 is a diagram schematically illustrating an example medium 254 which comprises slip evaluation instructions 280, geo-reference determination instructions 284, and mode control instructions 288. Slip evaluation instructions 280 direct processing unit 52 to determine a current (immediately preceding) degree of slip of vehicle 220. The slip of vehicle 220 may be the result of vehicle 220 turning while traversing a surface or terrain for which vehicle 220 has little traction. During turning, front ground traction members 26 may be traversing a different path (and a different greater distance) as compared to rear ground traction members 24. This may result in vehicle 220 under-steering. Purposely increasing front ground traction members slip or lead increases vehicle traction and thus helps the vehicle return to the intended shorter turning path. Slip evaluation instructions 280 evaluate such slippage based upon signals from GPS antenna 260 and speed sensors 264. A degree of slippage may be determined based upon a comparison of the actual physical change in position of vehicle 220 over a period of time as determined from the signals received by GPS antenna 260 with respect to the rotational speed of traction members 24, 26 over the period of time. The larger the difference, the greater is the degree of slip.

Geo-reference determination instructions 284 direct processing unit 52 to determine the geo-referenced location of vehicle 220 based upon signals from GPS antenna 260. The geo-referenced location of vehicle 220 may be in the form of longitudinal and latitudinal coordinates of vehicle 220 or in a form of projected coordinates.

Mode control instructions 288 direct processing unit 52 to output control signals actuating vehicle 220 between different propulsion modes. The actuation of vehicle 220 between the different modes may be in response to manual input by the operator and/or may be automatic. An operator may select, using operator interface 268, whether vehicle 220 is to be switched between different modes automatically or in response to operator commands entered via operator interface 268.

In response to an operator selecting a manual mode selection state, controller 250 switches vehicle 220 between the first mode and the second mode in response to operator commands received via operator interface 268. For example, the operator may appreciate the circumstance that the vehicle is about to travel along a road or highway having an underlying pavement providing a high degree of traction. In such circumstances, in appreciation that providing the front traction members of the vehicle with a lead may not be as beneficial and may unduly drain battery power, the operator may provide an input to controller 250 via operator interface 268 which causes controller 250 to output control signals actuating the vehicle from the first mode to the second mode in which the hydraulic pump is decoupled from the electric motor. In the second mode, controller 250 outputs control signals causing the output shaft electric motor 30 to be rotated in a reverse direction such that one-way clutch/bearing 40 does not transmit torque from electric motor 30 to hydraulic pump 38. In the second mode, controller outputs control signals actuating reversible transmission 232 to a reversed state which results in the reverse-direction torque from electric motor 30 driving rear ground traction members 24 in the forward direction.

When the vehicle is about to enter a field/vineyard and encounter lower traction conditions, the operator may provide an input to controller 250 via operator interface 268 which causes controller 250 to output control signals actuating the vehicle from the second mode to the first mode in which the hydraulic pump is once again coupled to the electric motor. In the first mode, controller 250 outputs control signals causing the output shaft electric motor 30 to be rotated in a forward direction such that one-way clutch/bearing 40 transmits torque from electric motor 30 to hydraulic pump 38 which in turn drives hydraulic motor 34 which supplies additional torque and rotational speed to front ground traction members 26 to provide front ground traction members 26 with a lead relative to rear ground traction members 24. In the first mode, the controller outputs control signals actuating reversible transmission 232 to a forward state which results in the forward direction of torque from electric motor 30 driving rear ground traction members 24 in the forward direction.

In some implementations, controller 250 may provide the operator with recommendations or suggestions as to the timing for the operator inputting commands for switching between the first mode and the second mode. Such suggestions may be provided by a visible recommendation provided by operator interface 268. In some implementations, the recommendation may be based upon a determined current or predicted slip of the vehicle 220 or its traction members as determined by controller 250 following slip evaluation instructions 280. As described above, the slip of the vehicle may be determined by comparing rotational velocity of the rear and/or front ground traction members during a period of time relative to an actual distance traversed by the vehicle 220 during the period of time.

In some implementations, the recommendation may be based upon a geo-referenced location of the vehicle. The geo-referenced location of the vehicle may be determined by controller 250 following geo-reference determination instructions 284. The GPS determined location of the vehicle may be compared to a predefined map which indicates probable traction conditions for different regions on the map. For example, GPS signals may indicate that the vehicle 220 is traveling along a pavement or highway where high traction conditions may exist. In such circumstances, a controller may provide the operator with a recommendation to switch the vehicle to the second mode. Alternatively, GPS signals indicate that the vehicle is about to enter a field or other terrain having low traction conditions where the vehicle may be vulnerable to slip. In such circumstances, the controller may provide the operator with the recommendation to switch the vehicle to the first mode.

In response the operator selecting an automatic mode switching state via operator interface 268, and further in response to the operator selecting use of measured slip for switching control, controller 250 may automatically switch between the modes based upon the determined slip or traction conditions. In some implementations, the slip measurement value determined by controller 250 following instructions 280 may be compared to a predefined slip threshold, wherein such switching may be based upon the comparison. For example, a slip value greater than a predefined threshold may trigger automatic actuation of vehicle 220 to the first mode. A slip value less than the predefined threshold may trigger automatic actuation of vehicle 220 to the second mode. In some implementations, immediately prior to the automatic actuation, controller 250 may provide the operator, via operator interface 268, with an opportunity to override the automatic change.

In response to the operator selecting an automatic mode switching state via operator interface 268, and further in response to the operator selecting use of geo-referenced locations for switching control, controller 250 may automatically switch between the modes based upon the geo-referenced location of the vehicle 220. The geo-referenced location of the vehicle 220 may be determined by controller 250 following geo-reference determination instructions 284. The GPS determined location of the vehicle may be compared to a predefined map which indicates probable traction conditions for different regions on the map. For example, GPS signals may indicate that the vehicle 220 is traveling along a pavement or highway where high traction conditions may exist. In such circumstances, a controller may automatically switch the vehicle to the second mode. Alternatively, GPS signals indicate that the vehicle is about to enter a field or other terrain having low traction conditions where the vehicle may be vulnerable to slip. In such circumstances, the controller 250 may automatically switch the vehicle 220 to the first mode. In some implementations, immediately prior to the automatic actuation, controller 250 may provide the operator, via operator interface 268, with an opportunity to override the automatic change.

In some implementations, the operator may select, via operator interface 268, a combination of measured slip and geo-referenced location for switching control. Different relative weights or prioritization may be applied to the measured slip and geo-referenced location when controller 250 determining whether to switch to the first mode or to the second mode. In some implementations, the operator may select the different weightings applied to the different measurements. For example, an operator may choose to apply a greater weight (or importance) to the measured slip relative to the anticipated slip or traction given the tractor's current geo-referenced location and the predefined traction map. Alternatively, the operator may choose to apply greater weight (or importance to the anticipated slip or traction given the tractor's current geo-referenced location in the predefined traction map relative to the current measured slip.

In some implementations, the switching of vehicle 220 between the first mode and the second mode by controller 250 may alternatively or additionally be based upon other factors. In some implementations, such switching may be additionally or alternatively based upon the current state of hydraulic coupling 258. For example, in circumstances where high traction conditions may exist that would otherwise allow hydraulic pump 38 to be decoupled from electric motor 30 in the second mode, switching to the second mode may be paused or inhibited in response to hydraulic coupling 258 currently being used to supply hydraulic pressurized flow to a hydraulically powered attachment associated with vehicle 220. Controller 250 may determine that hydraulic coupling 258 is currently being used based upon signals from a sensor associate with hydraulic coupling 258 or based upon other commands received by operator interface 268 requesting the use of the hydraulically powered attachment.

In some implementations, the switching between the first mode and the second mode by controller 250 may alternatively or additionally be based upon sensed turning of vehicle 220. Controller 250 may evaluate signals from steering sensor to determine when vehicle 220 is in a turning state. In response to such turning and in response to the turning satisfying a predefined turning degree threshold, controller 250 may automatically switch vehicle 220 from the first mode to the second mode or vice versa.

In some implementations, controller 250 may be automatically controlling the propulsion of vehicle 220 and the steering of vehicle 220 to move vehicle 220 along a predefined or predetermined path having predetermined straight, non-turning portions and turning portions (such as at the end of a row of plants or crops) where slip during turning may be of concern. In such implementations, controller 250 may automatically switch vehicle 220 between the first mode and the second mode based upon where vehicle 220 is located along the predefined path. When traveling along straight portions of the path, controller 250 may automatically actuate vehicle 220 to the second mode, decoupling hydraulic pump 38 from electric motor 30. Immediately prior to turning or during turning, controller 250 may automatically switch vehicle 220 to the first mode so as to provide front ground traction members 26 with a lead to reduce under-steering.

As discussed above, such automatic switching may depend upon whether hydraulic coupling 258 is currently in use or is to be used. For example, an implement may need to be raised or otherwise altered at the end of the row using hydraulics from the vehicle 220. In such circumstances, controller 250 may delay automatic switching to the second mode until the implement has been raised or altered. In some circumstances, the implement is to be powered during turning using hydraulics of vehicle 220. In such circumstances, vehicle 220 may remain in the first mode during turning. In some circumstances, the time at which the vehicle may be in the second mode is sufficiently brief such that more energy may be spent by the switching as compared to the energy savings from operating in the second mode. In such circumstances, controller 250 may leave vehicle in the first mode, rather than switching to the second mode, based on the controller predicted or anticipated duration of the second mode.

In some implementations, the controller 250, following commands entered via operator interface 268, may operate vehicle 220 in a third mode in which electric motor shaft electric motor 30 is driven in the first, forward direction and in which the transmission 232 is in the reversed state to propel the vehicle in a rearward direction. In some implementations, controller 250, following commands entered via operator interface 268, may operate vehicle 220 in a fourth mode in which the electric motor shaft of electric motor 30 is driven in the second rearward direction and in which the transmission 232 is in the forward state so as to decouple the electric motor 30 from the hydraulic pump 38 while propelling the vehicle 220 in a rearward direction.

Figure 5:
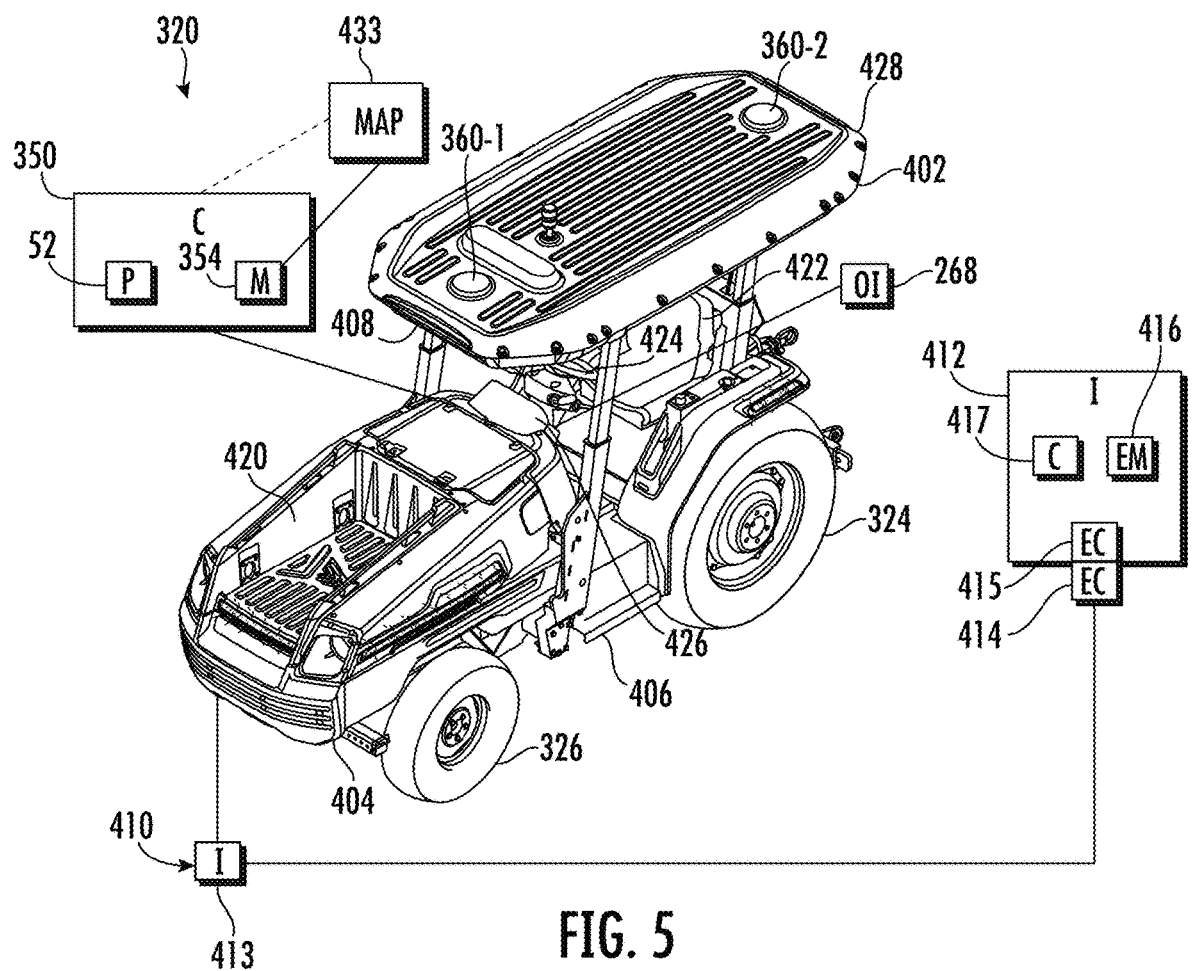
FIG. 5 is a front perspective view of an example vehicle comprising an example vehicle propulsion system.
Figure 6:
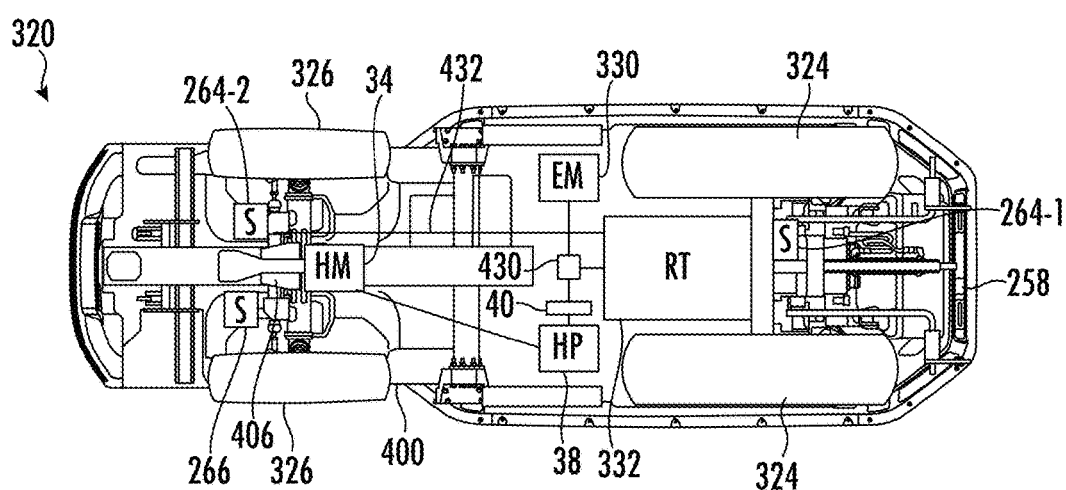
FIG. 6 is a bottom view of the example vehicle of FIG. 5.

FIGS. 5 and 6 illustrate an example vehicle 320 in the form of an example tractor. FIGS. 5 and 6 further illustrate an example implementation of vehicle 220 as part of an example tractor. Vehicle 320 comprises chassis 400, operator cab 402, rear ground traction members 324, front ground traction members 326, battery 404, electric motor 30 (shown FIG. 6), reversible transmission 332, hydraulic motor 34, planetary gear assembly 406, hydraulic pump 38, one way clutch/bearing 40, hydraulic coupling 258, GPS antennas 360-1, 360-2, speed sensors 264-1, 264-2, steering sensor 266, camera 408, operator interface 268, auxiliary power system 410, and controller 350.

Chassis 400 comprises a frame supporting the remaining components of vehicle 320. In the example illustrated, chassis 400 comprises a front cargo bed 420 for storing and transporting cargo. In the example illustrated, chassis 400 is further configured for connection to an attachment/implement with a hitch or other mounting structure.

Cab 402 comprises a compartment in which an operator may be seated when operating vehicle 320. Cab 402 comprises a seat 422, a steering wheel 424, a control console 426 and a roof 428. Roof 428 extends over control seat 422 and control console 426. In some implementations, roof 428 may be raised and lowered. In some implementations, roof 428 may be omitted.

Rear ground traction members 324 and front ground traction members 326 comprise members that engage the underlying terrain and which are driven. In the example illustrated, rear ground traction members 324 and front ground traction members 326 each comprise wheels. In other implementations, rear ground traction members 324 and front ground traction members 326 may comprise tracks or other ground engaging members.

Battery 404 comprises a battery unit that is removably received within a corresponding chamber or cavity extending rearwardly from the front of chassis 400. Battery 404 mates with a corresponding connection interface for transferring electrical power from battery 404 to the electrically powered components of vehicle 320. In other implementations, battery 404 may be located at other locations. In other implementations, battery 404 may be fixed and non-swappable or not removable. In the example illustrated, battery 404 electrically powers electric motor 30.

Electric motor 30, hydraulic motor 34, hydraulic pump 38, one way clutch/bearing 40, hydraulic coupling 258, and operator interface 268 are each described above with respect to vehicle 220. Electric motor 30 supplies torque to rear ground traction members 324 to drive rear ground traction members 324. When operating in the first mode, electric motor 30 further supplies torque in a first direction for powering hydraulic pump 38 which powers hydraulic motor 34 to drive front ground traction members 326. When operating in the second mode, motor 30 supplies torque in a second opposite direction which results in hydraulic pump 38 being decoupled from electric motor 30 by one way clutch/bearing 40 and which results in rear ground traction member 324 being driven in the forward direction due to the reversed state of reversible transmission 332.

Reversible transmission 332 is similar to reversible transmission 232 described above in that transmission 332 is reversible, operable to transmit torque and rotational speed in either direction. Reversible transmission 332 comprises a torque splitter 430 in the form of a bevel gear assembly so as to transmit torque from the output shaft of electric motor 30 to one way clutch/bearing 40 and to remaining components of reversible transmission 332. Reversible transmission 332 further comprises a transaxle 432 which delivers torque to an input of planetary gear assembly 406. In some implementations, reversible transmission 332 comprises a set of gears or a gearbox for providing various forward and reverse gears for vehicle 320.

Planetary gear assembly 406 serves as a junction for the torque supplied by hydraulic motor 34 and for the torque supplied by transaxle 432 from electric motor 30. Planetary gear assembly 406 comprises a first input which receives torque from transaxle 432, a second input which receives torque from hydraulic motor 34 and an output operably coupled to front ground traction members 326. In some implementations, the first input may comprise a ring gear, the second input may comprise a sun gear and the output may comprise a planet carrier supporting planet gears between the sun gear and the ring gear. In some implementations, the first input may comprise the sun gear, the second input may comprise the ring gear and the output may comprise a planet carrier supporting the planet gears between the sun gear in the ring gear. In other implementations, the sun gear, the ring gear in the planet carrier planet gears may each serve as one of the two inputs or the output.

GPS antennas 360 are supported by roof row 428. GPS antennas 360 comprise signal receptors configured to receive data/signals multiple GPS satellites. GPS antennas 360 are associated with a GPS receiver (provided as part of controller 350) for calculating position (and time) based upon the data/signals received by antenna. The position of vehicle 320, as determined from GPS signals, may be utilized to determine a geo-referenced location of vehicle 320 (latitude and longitude accordance of vehicle 320) at a particular moment in time and may be utilized to determine the velocity of vehicle 320 over a particular period of time.

Speed sensors 264-1, 264-2 (collectively referred to as sensors 264) sense the rotation (revolutions per minute) of rear ground traction members 324 and front ground traction members 326, respectively. In the example illustrated, speed sensors 264 comprise wheel encoders. In other implementations, speed sensor 264 may comprise other forms of sensors for detecting the rotational speed of traction members 324 and 326.

Steering sensor 266 comprises a rotary potentiometer to measure rotational displacement. Steering sensor 266 detects the adjustment of the orientation of front ground traction members 326 to indicate a steering angle for vehicle 320.

Camera 408 comprises one form of an example sensor configured to capture video or images in front of vehicle 320. In some implementations, camera 408 may comprise a stereo camera. In other implementations, camera 408 may comprise a monocular camera. Signals from camera 408 may be used by controller 350 to determine traction conditions for outputting mode suggestions to an operator or for automatically switching between modes.

Auxiliary power system 410 comprises electronics configured to provide electrical power to implement 412. Auxiliary power system 410 may be connected to implement 412 to power implement 412 when tractor 320 is in the second mode, wherein electric motor 330 and reversible transmission 332 are both in a reversed state. During such states, the power takeoff of tractor 320 (such as the power takeoff 708 of FIG. 7) may be disabled, such as by clutch 706 in FIG. 7. Auxiliary power system 410 provides a mechanism by which implement 412 may be driven when vehicle 320 is in the second mode and when the PTO is disabled. Exilic powers the 410 facilitates use of electric implements while tractor 320 is operating in the second mode.

Auxiliary power system 410 comprises an inverter 413 and an electrical connector 414. Inverter 413 converts electrical power from battery 404 for driving implement 412. Electric connector 414 comprises a plug or other connector configured for releasable connection to a port or other electrical connector 415 of implement 412. As schematically shown, implement 412 may comprise an electric motor 416, such as a high efficient permanent magnet electric motor. Electric motor 416 may be controlled by a motor controller 417, such as a speed controller or an RPM controller. Controller 417 may communicate with controller 350 in a wired or wireless fashion, whereby an operator may control electrical motor 416 powering the implement.

In some implementations, the torque provided by electric motor 416 may be utilized to power or drive a fluid pump, such as used with a sprayer. In some implementations, torque provided by electric motor 416 may be utilized to power or drive other tools associated with implement 412. In some implementations, auxiliary power system 410 may be omitted.

Controller 350 is similar to controller 250 described above except that controller 350 comprises a non-transitory computer-readable medium 354 in place of medium 254. Medium 354 is itself similar to medium 254 in that medium 354 comprise slip evaluation instructions 280, geo-reference determination instructions 284 and mode control instructions 288 (described above with respect to FIG. 4).

Following slip evaluation instructions 280, controller 350 may determine a current degree of slip of vehicle 320. The slip of vehicle 320 may be the result of vehicle 320 turning while traversing a surface or terrain for which vehicle 320 has little traction. During turning, front ground traction members 326 may be traversing a different path and a different greater distance) as compared to rear ground traction members 324. This may result in vehicle 320 slipping. Controller 350 may evaluate such slippage based upon signals from GPS antenna 360 and speed sensors 264. A degree of slippage may be determined based upon a comparison of the actual physical change in position of vehicle 320 over a period of time as determined from the signals received by GPS antenna 360 with respect to the rotational speed of traction members 324, 326 over the period of time. The larger the difference, the greater is the degree of slip.

Following geo-reference determination instructions 284, controller 350 may determine the geo-referenced location of vehicle 320 based upon signals from GPS antenna 360. The geo-referenced location of vehicle 320 may be in the form of longitudinal and latitudinal coordinates of vehicle 320.

Following mode control instructions 288, controller 350 may output control signals actuating vehicle 320 between different propulsion modes. The actuation of vehicle 320 between the different modes may be manual (by the operator) and/or may be automatic. An operator may select, using operator interface 268, whether controller 350 is to switch between different modes automatically or in response to operator commands entered via operator interface 268.

In response to an operator selecting a manual mode selection state, controller 350 switches vehicle 320 between the first mode and the second mode in response to operator commands received via operator interface 268. For example, the operator may appreciate the circumstance that the vehicle is about to travel along a road or highway having an underlying pavement providing a high degree of traction or that turning of the vehicle 320 will be less frequent. In such circumstances, in appreciation that providing the front traction members 326 of the vehicle 320 with a lead may not be as beneficial and may unduly drain battery power, the operator may provide an input to controller 350 via operator interface 268 which causes controller 350 to output control signals actuating the vehicle 320 from the first mode to the second mode in which the hydraulic pump 38 is decoupled from the electric motor 30. In the second mode, controller 350 outputs control signals causing the output shaft electric motor 30 to be rotated in a reverse direction such that one-way clutch/bearing 40 does not transmit torque from electric motor 30 to hydraulic pump 38. In the second mode, the controller outputs control signals actuating reversible transmission 332 to a reverse state which results in the reverse-direction torque from electric motor 30 driving rear ground traction members 324 in the forward direction.

When the vehicle is about to enter a field/vineyard and encounter lower traction conditions, the operator may provide an input to controller 350 via operator interface 268 which causes controller 350 to output control signals actuating the vehicle from the second mode to the first mode in which the hydraulic pump is once again coupled to the electric motor. In the first mode, controller 350 outputs control signals causing the output shaft electric motor 30 to be rotated in a forward direction such that one-way clutch/bearing 40 transmits torque from electric motor 30 to hydraulic pump 38 which in turn drives hydraulic motor 34 which supplies additional torque and rotational speed to front ground traction members 326 to provide front ground traction members 326 with, for example, a positive lead (greater ground speed) relative to rear ground traction members 324. In the first mode, controller outputs control signals actuating reversible transmission 332 to a forward state which results in the forward direction of torque from electric motor 30 driving rear ground traction members 324 in the forward direction.

In some implementations, the vehicle may provide the operator with recommendations or suggestions as to the timing for the operator inputting commands for switching between the first mode and the second mode. Such suggestions may be provided by a visible recommendation provided on operator interface 268. In some implementations, the recommendation may be based upon a determined current or predicted slip of the vehicle 320 determined by controller 350 following slip evaluation instructions 280. As described above, the slip of the vehicle 320 may be determined by comparing rotational velocity of the rear and/or front ground traction members during a period of time relative to an actual distance traversed by the vehicle 320 during the period of time.

In some implementations, the recommendation may be based upon a geo-referenced location of the vehicle 320. The geo-referenced location of the vehicle 320 may be determined by controller 350 following geo-reference determination instructions 284. The GPS determined location of the vehicle 320 may be compared to a predefined map 433 which indicates probable traction conditions for different regions on the map. In some implementations, the traction map 433 may locally reside on the vehicle 320. As indicated by broken lines, in some implementations, the traction map 433 may be remote from vehicle 320, stored on a remote storage device or remote server, available for access by controller 350 in a wireless fashion.

Controller 350 may use the GPS signals to locate the vehicle 320 on the traction map 433 to determine the ground or terrain conditions along the forthcoming or anticipated path of vehicle 320. For example, GPS signals may indicate that the vehicle 320 is traveling along a pavement or highway where high traction conditions may exist. In such circumstances, the controller 350 may provide the operator with a recommendation to switch the vehicle 320 to the second mode. Alternatively, GPS signals may indicate that the vehicle is about to enter a field or other terrain having low traction conditions where the vehicle may be vulnerable to under-steering, especially during tight turning. In such circumstances, the controller 350 may provide the operator with the recommendation to switch the vehicle 320 to the first mode.

In response the operator selecting an automatic mode switching state via operator interface 268, and further in response to the operator selecting use of measured slip for switching control, controller 350 may automatically switch between the modes based upon the determined slip conditions. In some implementations, the slip measurement value determined by controller 350 following instructions 280 may be compared to a predefined slip threshold, wherein such switching may be based upon the comparison. For example, a slip value greater than a predefined threshold may trigger automatic actuation of vehicle 320 to the first mode. A slip value less than the predefined threshold may trigger automatic actuation of vehicle 320 to the second mode. In some implementations, immediately prior to the automatic actuation, controller 350 may provide the operator, via operator interface 268, with an opportunity to override the automatic change.

In response the operator selecting an automatic mode switching state via operator interface 268, and further in response to the operator selecting use of geo-referenced locations for switching control, controller 350 may automatically switch between the modes based upon the geo-referenced location of the vehicle. The geo-referenced location of the vehicle may be determined by controller 350 following geo-reference determination instructions 284. The GPS determined location of the vehicle may be compared to a predefined map 433 which indicates probable traction conditions for different regions on the map. For example, GPS signals may indicate that the vehicle 320 is traveling along a pavement or highway where high traction conditions may exist. In such circumstances, a controller may automatically switch the vehicle 320 to the second mode. Alternatively, GPS signals indicate that the vehicle 320 is about to enter a field or other terrain having low traction conditions where the vehicle may be vulnerable to slip. In such circumstances, the controller 350 may automatically switch the vehicle to the first mode. In some implementations, immediately prior to the automatic actuation, controller 350 may provide the operator, via operator interface 268, with an opportunity to override the automatic change.

In some implementations, the operator may select, via operator interface 268, a combination of measured slip and geo-referenced location for switching control. Different relative weights or prioritizations may be applied to the measured slip and geo-referenced location when controller 350 is determining whether to switch to the first mode or to the second mode. In some implementations, the operator may select the different weightings applied to the different measurements/determinations. For example, an operator may choose to apply a greater weight (or importance) to the measured slip relative to the anticipated slip or traction given the vehicle's current geo-referenced location and the predefined traction map 433. Alternatively, the operator may choose to apply greater weight (or importance) to the anticipated slip or traction given the vehicle's current geo-referenced location in the predefined traction map 433 relative to the current measured slip.

In some implementations, in lieu of or in addition to using the geo-referenced to control the switching between modes, controller 350 may output a mode change recommendation or may automatically carry out a mode change based upon an evaluation of images captured by camera 408. For example, controller 350 may be part of a neural network trained to identify or distinguish between high and low traction terrains. For example, using a set of training images, or another type of ground characterization sensor, controller 350 may be configured to distinguish between a captured image of a road or pavement which may lead to using the second mode (described above) versus a captured image of a field, vineyard or orchard having soft ground or soil which may lead to using the first mode (described above). Using captured images of the terrain in front of vehicle 320, controller 350 may predict the forthcoming traction conditions and may automatically switch between the first mode and the second mode as appropriate.

In some implementations, the switching of vehicle 320 between the first mode and the second mode by controller 350 may alternatively or additionally be based upon other factors. In some implementations, such switching may be additionally or alternatively based upon the current state of hydraulic coupling 258. For example, in circumstances where high traction conditions may exist that would otherwise allow hydraulic pump 38 to be decoupled from electric motor 30 in the second mode, switching to the second mode may be paused or inhibited in response to hydraulic coupling 258 currently being used to supply hydraulic pressurized flow to a hydraulically powered attachment associated with vehicle 220. Controller 250 may determine that hydraulic coupling 258 is currently being used based upon signals from a sensor associate with hydraulic coupling 258 or based upon other commands received by operator interface 268 requesting the use of the hydraulically powered attachment.

In some implementations, the switching between the first mode and the second mode by controller 250 may alternatively or additionally be based upon sensed turning of vehicle 320. Controller 350 may evaluate signals from steering sensor to determine when vehicle 320 is in a turning state. In response to such turning in response to the turning satisfying a predefined turning degree threshold, controller 350 may automatically switch vehicle 320 from the first mode to the second mode or vice versa.

In some implementations, controller 350 may be automatically controlling the propulsion of vehicle 320 and the steering of vehicle 320 to move vehicle 320 along a predefined or predetermined path having predetermined straight, non-turning portions and turning portions (such as at the end of a row of plants or crops) where slip may be of concern during turning. In such implementations, controller 350 may automatically switch vehicle 320 between the first mode and the second mode based upon where vehicle 320 is located along the predefined path. When traveling along straight portions of the path, controller 350 may automatically actuate vehicle 320 to the second mode, decoupling hydraulic pump 38 from electric motor 30. Immediately prior to turning or during turning, controller 350 may automatically switch vehicle 320 to the first mode so as to provide front ground traction members 326 with a lead to reduce slippage.

As discussed above, such automatic switching may depend upon whether hydraulic coupling 358 is currently in use or is to be used. For example, an implement may need to be raised or otherwise altered at the end of the row using hydraulics from the vehicle 320. In such circumstances, controller 350 may delay automatic switching to the second mode until the implement has been raised or altered. In some circumstances, the implement is to be powered during turning using hydraulics of vehicle 320. In such circumstances, vehicle 320 may remain in the first mode during turning. In some circumstances, the time at which the vehicle may be in the second mode is sufficiently brief such that more energy may be spent by the switching as compared to the energy savings from operating in the second mode. In such circumstances, controller 350 may leave vehicle in the first mode, rather than switching to the second mode, based on the predicted or anticipated duration of the second mode.

In some implementations, the controller 350, following commands entered via operator interface 268, may operate vehicle 320 in a third mode in which electric motor shaft electric motor 30 is driven in the first, forward direction and in which the transmission 332 is in the reversed state to propel the vehicle in a rearward direction. In some implementations, controller 350, following commands entered via operator interface 268, may operate vehicle 320 in a fourth mode in which the electric motor shaft of electric motor 30 is driven in the second rearward direction and in which the transmission 332 is in the forward state so as to decouple the electric motor 30 from the hydraulic pump 38 while propelling the vehicle 320 in a rearward direction.

Figure 7:
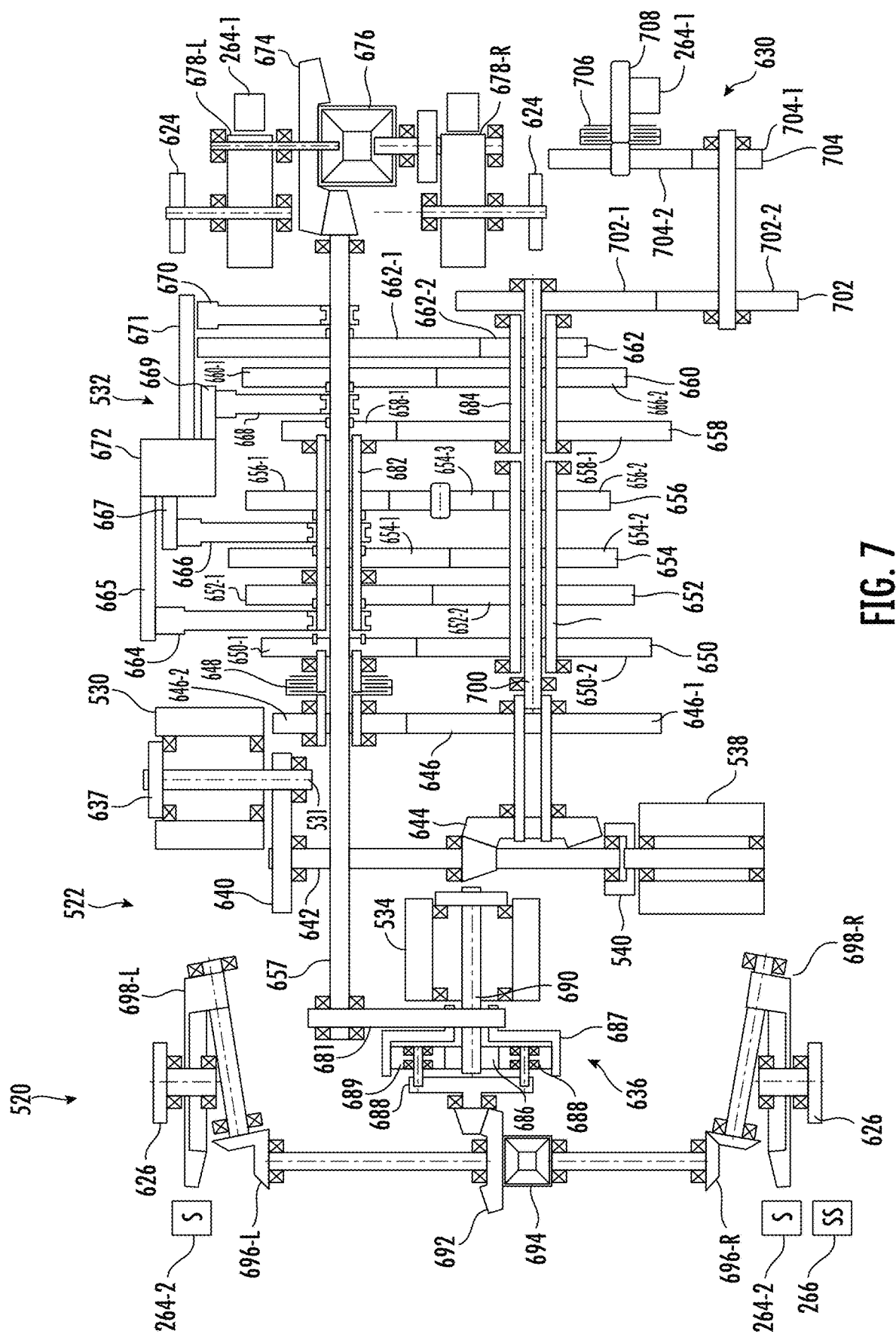
FIG. 7 is a diagram illustrating an example vehicle propulsion system for use in the example vehicle of FIG. 5.

FIG. 7 is a diagram illustrating portions of an example vehicle 520. FIG. 7 illustrates a particular example of a vehicle propulsion system 522. In some implementations, vehicle propulsion system 522 is utilized as part of vehicle 320 or as part of vehicle 220 described above. For example, vehicle propulsion system 522 may be utilized in vehicle 320 described above and may be controlled by controller 350 following instructions contained in medium 354 as described above. Vehicle propulsion system 522 provides each of the first, second, third and fourth propulsion modes described above with respect to vehicles 220 and 320. Vehicle propulsion system 522 comprises rear ground traction member flanges 624, front ground traction member flanges 626, electric motor 530, reversible transmission 532, power takeoff system 630, hydraulic motor 534, hydraulic pump 538, one way clutch/bearing 540, and planetary gear assembly 636.

Rear ground traction member flanges 624 are configured to be coupled to rear ground traction members 324 described above. Front ground traction member flanges 626 are configured to be coupled to front ground traction members 326 described above.

Motor 530 comprising electric motor electrically powered by a battery, such as battery 404 (shown in FIG. 5). Motor 530 has an output shaft 531. In the example illustrated, motor 530 is further provided with an encoder 637 for providing controller 350 with signals indicating the current speed and direction of the torque being output by motor 530.

Reversible transmission 532 transmits torque from the output shaft 531 of motor 530 to rear ground traction member flanges 624, front ground traction member flanges 626, and power takeoff system 630. Reversible transmission 532 is actuatable or switchable between a forward state and a reversed state. The forward state and the reversed state do not necessarily refer to the direction in which vehicle 520 is being propelled by the supplied torque.

As shown by FIG. 7, reversible transmission 532 comprises gear set 640, driveshaft 642, gear set gear set 646, drive clutch 648, gear set 650, gear set 656, transaxle 657, gear set 658, gear set 660, gear set 662, shift fork 664, shift rail 665, shift fork 666, shift rail 667, shift fork 668, shift rail 669, shift fork 670, shift rail 671, automated shifter 672, gear set 674, differential 676, and gear sets 678-L, 678-R. Gear set 640 serves as a speed reducer, transmitting torque from output shaft 531 to driveshaft 642. Driveshaft 642 is connected to one way clutch/bearing 540 and is also connected to gear set 644. Gear set 644 comprises a pair of bevel gears which transmit torque to gear set 646 and to power takeoff system 630. Gear set 646 comprises a first gear 646-1 connected to gear set 644 and a second gear 646-2 which is connectable to gear 650-1 of gear set 650 by drive clutch 648, wherein drive clutch 648 may be under the control of controller 350.

Gear set 650 comprises a first gear 650-1 connected to drive clutch 648 and a second gear 650-2 supported by a rotatable hub 680. Gear set 652 comprises a first gear 652-1 supported by a rotatable hub 682 and a second gear 652-2 supported by hub 680. Gear set 654 comprises a first gear 654-1 supported by hub 682, a second gear 654—supported by hub 680 and an intermediate gear 654-3 intermeshing with and between gears 654-1 and 654-2. Gear set 656 provides a reverse state for transmission 532. Gear set 658 comprises a first gear 658-1 supported by hub 682 and a second gear 658-2 connected to rotatable hub 684. Gear set 660 comprises a first gear 660-1 supported by transaxle 657 and a second gear 660-2 connected to hub 684. Gear set 662 comprises a first gear 662-1 supported by transaxle 657 and a second gear 662-2 connected to hub 684. Gears 652-1, 654-1 and 656-1 are each rotatable about hub 682 and are selectively connectable for rotation in unison with hub 682 by shift forks. Gears 660-1 and 662-1 are each rotatable about transaxle 657 and are selectively connectable for rotation in unison with transaxle 657 by shift forks. Gear 650-1 is selectively connectable to hub 682 and gear 658-1 selectively connectable to transaxle 657 by shift forks.

Shift rails 665, 667, 669, and 671 movably support shift forks 664, 666, 668 and 670, respectively. Each of shift forks 664, 666, 668 and 670 are selectively movable or actionable by automated shifter 672 under the control of controller 350. Shift fork 664 may be actuated to selectively connect gear 650-1 of gear set 650 to hub 682. Shift fork 666 may be actuated to selectively connect gear 654-1 to hub 682 or to selectively connect gear 656-1 to hub 682. Shift fork 668 may be actuated to selectively connect gear 658-1 to transaxle 657 or to selectively connect gear 660-12 transaxle 657. Shift fork 670 may be actuated to selectively connect gear 662-1 to transaxle 657. Through the selective actuation of shift forks 664, 666, 668 and 670 by shifter 672, controller 350 may actuate transmission 532 between different gears and between a forward state and a reversed state.

Transaxle 657 transmits torque to gear set 674. Gear set 674 comprises a set of bevel gears connected to differential 676. Differential 676 outputs torque to the left gear set 678-L and the right gear set 678-R which further transmit torque to the left and right flanges 624. Transaxle 657 further transmits torque to an input of planetary gear assembly 636. In the example illustrated, transaxle 657 is operably coupled to planetary gear assembly 636 by a flexible belt or chain 681.

Hydraulic motor 534 is powered by hydraulic pump 538. In the example illustrated, hydraulic pump 538 comprises a continuous input variable displacement hydraulic piston pump. Hydraulic motor 534 comprises a modulation hydraulic motor.

Planetary gear assembly 636 combines torque from transaxle 657 and from hydraulic motor 534 and outputs the combined torque to front ground traction members 326 (shown In FIG. 5) which are connected to front ground traction member flanges 626. Planetary gear assembly 636 comprises a sun gear 686, ring gear 687, and planet carrier 688 supporting planet gears 689 which intermesh with sun gear 686 and ring gear 687.

Sun gear 686 serves as a first input for planetary gear assembly 636. Sun gear 686 is connected to and receives torque from output shaft 690 of hydraulic motor 534. Ring gear 687 serves as a second input for planetary gear assembly 636. Ring gear 687 is connected to transaxle 657 by chain 680. Planet carrier 688 is connected to gear set 692 and serves as an output for planetary gear assembly 636.

Gear set 692 comprises a pair of bevel gears connected to differential 694. Differential 694 outputs torque to gear sets 696-L and 696-R which further transmit torque to gear sets 698-L and 698-R which are connected to left and right front ground traction member flanges 626.

Power takeoff assembly 630 comprises driveshaft 700, gear set 702, gear set 704, power takeoff clutch 706, and power takeoff shaft 708. Driveshaft 700 is connected to gear 646-1, extending through hub 680 and hub 684. Driveshaft 700 is connected to a first gear 702-1 of gear set 702 which is enmeshed engagement with a second gear 702-2. Gear 702-2 is connected to a first gear 704-1 of gear set 704 which is enmeshed engagement with a second gear 704-2. Gear 704-2 is selectively connectable to PTO shaft 708 by power takeoff clutch 706. In some implementations, power takeoff assembly 630 may be omitted.

When propulsion system 522 is operated in the first mode, the front ground traction members 326 are driven in a forward direction with torque being concurrently supplied by both electric motor 530 via transaxle 657 and hydraulic motor 538 which is supplied with pressurized fluid by hydraulic pump 538. The front ground traction members 530 are provided with a lead.

When propulsion system 522 is operated in the second mode, torque from the electric motor 530 is not transmitted to the hydraulic pump 538, being decoupled from motor 530 by the one-way bearing/clutch 540. In the second mode, the hydraulic motor 538 does not receive fluid pressurized by the hydraulic pump 538 and does not supply torque to the planetary gear assembly 636. As a result, the torque received by the ring gear 687 of the planetary gear assembly 636 from electric motor 530 (via the transaxle 657 and the flexible belt or chain 681) is not transmitted to the front ground traction members 326 by the planetary gear assembly 636. Instead, the torque received by the ring gear 687 of the planetary gear assembly 636 drives shaft 690 and causes hydraulic fluid within the hydraulic motor 538 to be circulated within a closed loop fluid circuit with little friction. The front ground traction members 326 are allowed to idle and freely rotate, wherein forward propulsion of the vehicle is provided solely by the rear ground traction members 324.

As further shown by FIG. 7, propulsion system 522 may additionally comprise speed sensor 264-1 and 264-2 and steering sensor 266 (described above with respect to vehicle 220). Controller 350 may actuate vehicle 520 between the above-described first, second, third and fourth modes. Actuation between the different modes may be manual, from a local or remote operator, or may be automatic. Manual actuation between the different modes by the operator may be in view of data or recommendations provided the operator such as the current measured slip conditions, the geo-referenced location of the vehicle relative to a traction map (such as map 433), the sensed or detected terrain in front of vehicle 520, the detected turning state of the vehicle, the position of vehicle 520 along a predefined travel path, and/or the current state of power takeoff assembly 630. Automatic actuation of vehicle 520 between the different modes by controller 350 may likewise be based upon or triggered by current measured slip conditions, the geo-referenced location of the vehicle relative to a traction map (such as map 433), the sensed or detected terrain in front of vehicle 520, the detected turning state of the vehicle, the position of vehicle 520 along a predefined travel path, and/or the current state of power takeoff assembly 630.

Although the present disclosure has been described with reference to example implementations, workers skilled in the art will recognize that changes may be made in form and detail without departing from the scope of the claimed subject matter. For example, although different example implementations may have been described as including features providing benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:
1. A vehicle comprising:
   rear ground traction members;
   front ground traction members;
   an electric motor having an output shaft;
   a hydraulic motor operably coupled to the front ground traction members;
   a hydraulic pump operably coupled to the electric motor for being powered by the electric motor and operably coupled to the hydraulic motor to drive the hydraulic motor; and
   a controller configured to:
      output control signals causing the vehicle to operate in a first mode in which the electric motor transmits torque to rear ground traction members of the vehicle and to the hydraulic pump such that the vehicle is driven in a forward direction;

output control signals causing the vehicle to operate in a second mode in which the electric motor transmits torque to rear ground traction members of the vehicle such that the vehicle is driven in the forward direction, wherein torque is not transmitted to the hydraulic pump;

determine at least one state selected from a group of states consisting of: a state of an implement attached to the vehicle; a present or forthcoming turning state of the vehicle; a geo-referenced location of the vehicle; a slip of the vehicle; and a camera captured image of terrain; and output a recommendation to an operator for operator selection of either the first mode or the second mode based upon the determined at least one state or automatically switch between the first mode and the second mode based on the determined at least one state.

2. The vehicle of claim 1, wherein the controller in the first mode causes the electric motor and the hydraulic motor to concurrently drive the front ground traction members forwardly.

3. The vehicle of claim 2, wherein the controller, in the first mode, is configured to output control signals varying an amount of rotational speed supplied by the hydraulic motor to the front ground traction members relative to an amount of rotational speed supplied by the electric motor to the rear ground traction members.

4. The vehicle of claim 1 further comprising a hydraulic power coupling for delivering pressurized hydraulic fluid from the hydraulic pump to a hydraulically powered implement.

5. The vehicle of claim 1 further comprising:
a transaxle operably coupled to the electric motor to receive torque from the electric motor; and
a planetary gear assembly comprising:
an output operably coupled to the front ground traction members;
a first input operably coupled to the transaxle to receive torque from the transaxle; and
a second input operably coupled to the hydraulic motor to receive torque from the hydraulic motor.

6. The vehicle of claim 5, wherein the first input comprises a ring gear, wherein the second input comprises a sun gear, and wherein the output comprises a planet carrier supporting planet gears between the sun gear and the ring gear.

7. The vehicle of claim 1 wherein the hydraulic pump comprises a variable displacement hydraulic piston, or vane, pump.

8. The vehicle of claim 1, wherein the controller is configured to output the recommendation to the operator for the operator selection of either the first mode or the second mode based upon the determined at least one state.

9. The vehicle of claim 1, wherein the controller is configured to automatically switch between the first mode and the second mode based on the determined at least one state.

10. The vehicle of claim 1 further comprising:
a reversible transmission operably coupling the electric motor to the rear ground traction members to drive the rear ground traction members; and
a one-way clutch/bearing operably coupled between the electric motor and the hydraulic pump,
wherein the controller is configured to transmit different control signals to the reversible transmission and to the electric motor to operate the vehicle in the first mode and the second mode.

11. The vehicle of claim 1, wherein the output shaft of the electric motor is driven in a first direction in the first mode and a second direction in the second mode.

12. The vehicle of claim 11, wherein the controller is configured to:
operate the vehicle in a third mode in which the electric motor shaft is driven in the first direction and in which the transmission is in the reversed state to propel the vehicle in a rearward direction; and.

13. The vehicle of claim 12, wherein the controller is configured to: operate the vehicle in a fourth mode in which the electric motor shaft is driven in the second direction and in which the transmission is in the forward state so as to decouple the electric motor from the hydraulic pump while propelling the vehicle in a rearward direction.

14. The vehicle of claim 1, wherein the controller is configured to output the recommendation to the operator for either the first mode or the second mode based upon the determined present or forthcoming turning state.

15. The vehicle of claim 1, wherein the controller is configured to automatically switch between the first mode and the second mode based upon the determined present or forthcoming turning state.

16. The vehicle of claim 1, wherein the controller is configured to output the recommendation to the operator for either the first mode or the second mode based upon the determined terrain condition.

17. The vehicle of claim 1, wherein the controller is configured to automatically switch between the first mode and the second mode based upon the determined terrain condition.

18. The vehicle of claim 1, wherein the controller is configured to output the recommendation to the operator for either the first mode or the second mode based upon the determined slip.

19. The vehicle of claim 1, wherein the controller is configured to automatically switch between the first mode and the second mode based upon the determined slip.

20. The vehicle of claim 1, the controller is configured to:
determine a slip of the vehicle;
determine a geo-referenced location of the vehicle; and
to either output a recommendation to an operator for switching between the first mode and the second mode or automatically switch between the first mode and the second mode based upon a combination of the determined slip and the determined geo-referenced location.

21. The vehicle of claim 1, wherein the controller is configured to determine hydraulic implement powering by the hydraulic pump, wherein the controller is configured to automatically switch between the first mode and the second mode based upon a determined hydraulic implement powering.

* * * * *